United States Patent [19]

Terabayashi et al.

[11] 4,331,280
[45] May 25, 1982

[54] METHOD OF JOINTING PIPES BY FRICTION WELDING

[75] Inventors: Takao Terabayashi, Yokohama; Kenichi Waragai, Fujisawa; Atsuya Kamada, Kamakura; Masaru Kobayashi, Tokyo; Izumi Ochiai, Tochigi; Yoiti Wakabayashi, Sano, all of Japan

[73] Assignee: Hitachi, Ltd., Tokyo, Japan

[21] Appl. No.: 221,369

[22] Filed: Dec. 30, 1980

Related U.S. Application Data

[63] Continuation of Ser. No. 59,736, Jul. 23, 1979, abandoned.

[30] Foreign Application Priority Data

Jul. 24, 1978 [JP] Japan .................................. 53-89461

[51] Int. Cl.³ ............................................. B23K 20/14
[52] U.S. Cl. ........................................ 228/112; 228/2
[58] Field of Search .................... 228/2, 112, 113, 114

[56] References Cited

U.S. PATENT DOCUMENTS 2,795,039 6/1957 Hutchins ............................. 228/114
3,134,278 5/1964 Hollander et al. ...................... 228/2
3,234,644 2/1966 Hollander ............................ 228/2 X
3,504,425 4/1970 Sutovsky et al. .................... 228/2 X
4,144,110 3/1979 Luc ..................................... 228/2 X Primary Examiner—Gil Weidenfeld
Assistant Examiner—K. J. Ramsey
Attorney, Agent, or Firm—Craig & Antonelli

[57] ABSTRACT

A method for jointing two pipes such as an aluminum pipe and a copper pipe by friction welding. The aluminum pipe is inserted into a bore of a ring made of a heat resistant material, the bore having a straight section and a tapered section continuous from the straight section. The copper pipe has a tapered end peripheral surface. The copper pipe is pressed at its tapered end, in a rotating state, against the end of the aluminum pipe so as to expand the latter. As a result, an ironing is effected on the aluminum pipe by the straight section of the bore of the ring, such that the aluminum pipe overlies the straight section of the copper pipe in close contact with the latter. Consequently, the tapered surface of the copper pipe is friction welded to corresponding portion of the aluminum pipe while the latter is being backed up by the tapered section of the bore of the ring.

7 Claims, 9 Drawing Figures

METHOD OF JOINTING PIPES BY FRICTION WELDING

This is a continuation of application Ser. No. 059,736, filed July 23, 1979, now abandoned.

BACKGROUND OF THE INVENTION

The present invention relates to a method of jointing by friction welding a pipe of a metal which exhibits a comparatively small resistance against deformation, e.g. aluminum and a pipe made of a metal which exhibits a comparatively large resistance against the deformation e.g. copper.

Various welding methods can be used for producing weld joint of thin-walled pipes of a wall thickness of 5 mm or less, such as gas welding, resistance welding including flash welding, butt welding, and flash butt welding, brazing, soldering and so forth. Particularly, flash butt welding and doffisopm bonding are usually used for jointing two metals which exhibit small weldability to each other. These methods, however, suffer from inferior working properties.

A welding method which is usually referred to as friction welding provides an efficient and prompt jointing of two pipes. This method, however, cannot be suitably used for jointing thin-walled pipes having wall thickness of 5 mm or less and pipes having small outside diameter e.g. 20 mm or less, because such pipes usually have small resistance against deformation and are easily buckled or all subjected axial misalignment during the friction welding.

Thus, when an aluminum thin-walled pipe 2 having a small resistance against the deformation is jointed by a friction welding to a thin-walled copper pipe 1, the aluminum pipe 2 is buckled as illustrated in FIG. 1a, or axially misaligned with the copper pipe as illustrated in FIG. 1b to impair the quality of the weld joint. It is liable to occur that, since the aluminum thin-walled pipe 1 has a small resistance against deformation, the aluminum pipe is inconveniently deformed as illustrated in FIG. 1c by a comparatively small pressing force, so that the temperature rise required for the welding cannot be obtained. In such a case, it is not possible to effect a good weld.

For these reasons, the welding of thin-walled and small-diameter pipes has to be made by the aforementioned various welding methods at a cost of low efficiency of the work, rather than by the friction welding which permits an efficient and prompt welding operation.

SUMMARY OF THE INVENTION

It is, therefore, an object of the invention to provide a method which makes it possible to joint a thin-walled pipe of a metal having a comparatively small resistance against deformation, e.g. aluminum, to a thin-walled pipe of a comparatively large resistance against deformation, e.g. copper or iron, by a friction welding which cannot be adopted conventionally for this kind of purpose, at a high welding strength and with a minimum amount of internal burrs to eliminate as much as possible the subsequent cutting of the inner surface for removing the burrs.

The above stated object is fulfilled by the invention as will be understood from the following description. Namely, according to the invention, one of the pipes to be welded made of a relatively hard metal such as copper or iron having a comparatively small resistance against deformation has a tapered peripheral surface at its one end. The pipe of the hard metal is clamped by a chuck which is rotated at a high speed.

The other pipe to be welded which is made of a relatively soft material such as aluminum having a comparatively large resistance to the deformation is inserted into a bore of a ring which is made of a heat insulating material. The bore of the ring has a straight section of a diameter smaller than the sum $(d_B + 2t_A)$ of the outside diameter $d_B$ of the hard pipe and a double of the thickness of the soft pipe and a tapered section the diameter of which is gradually decreased substantially to the outside diameter $d_A$ of the soft pipe. The soft pipe is then pressed against the tapered end of the hard pipe while the latter is being rotated. As a result, the tapered end of the hard pipe is driven into the soft pipe to expand the latter and, simultaneously, ironed by the straight section of the bore to produce a heat thereby to preheat the joint area. Then, the soft pipe is pressed between the tapered end of the hard pipe and the tapered portion of the ring so that the tapered end of the hard pipe is friction welded to the corresponding portion of the soft pipe while the latter is being backed up by the tapered section of the bore.

Finally, the rotating pipe is abruptly stopped and the friction-welded joint is moved out of the heat insulating ring and is cooled by the ambient air, thus completing the friction welding.

As stated above, according to the invention, the hard pipe has a tapered end surface it which it is driven into the soft pipe to expand the latter. By so doing, it is possible to keep the pipes in axial alignment with each other during the friction welding.

In addition, a ring having a strength greater than that of at least the soft pipe and having a tapered bore is used to make it possible to apply a considerable axial pressing force to the joint surfaces.

Further, in order to attain a quick temperature rise at the joint surfaces, the ring is made of a heat insulating material.

Also, since the end surface of the hard pipe is tapered, a large joint surface area which is about three times as large as the original joint surface is obtained, so that it is possible to joint thin-walled pipes which inherently have small joint areas.

The straight section of the bore of the heat insulating ring, having a diameter smaller than the sum $(d_B + 2t_A)$ of the outside diameter $d_B$ of the hard pipe and the wall thickness $t_A$ of the soft pipe conveniently provides an ironing effect of about 20% of the wall thickness on the soft pipe. The heat generated during this ironing effectively preheats the joint surfaces which in turn affords a temperature rise in a short period of time when the tapered surfaces are friction welded to each other.

Moreover, the invention excludes various defects such as undesirable thinning of the tapered portion of the welded soft pipe, closing of the pipe due to a too large penetration of the hard pipe into the soft pipe and so forth. Also, the invention ensures a greater strength of the weld joint, due to the presence of the straight section.

DETAILED DESCRIPTION OF THE INVENTION

Figure 1A:
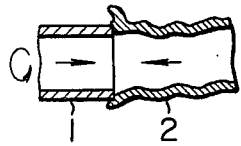
FIGS. 1a, 1b and 1c illustrate various phenomena which are observed when an aluminum pipe is jointed to a copper pipe by means of a conventional friction welding method.
Figure 1B:
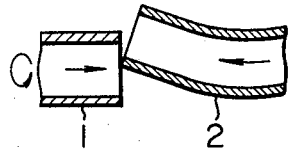
Figure 1C:
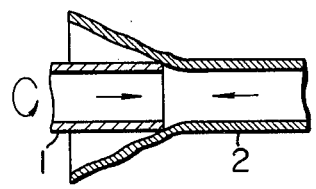
Figure 2:
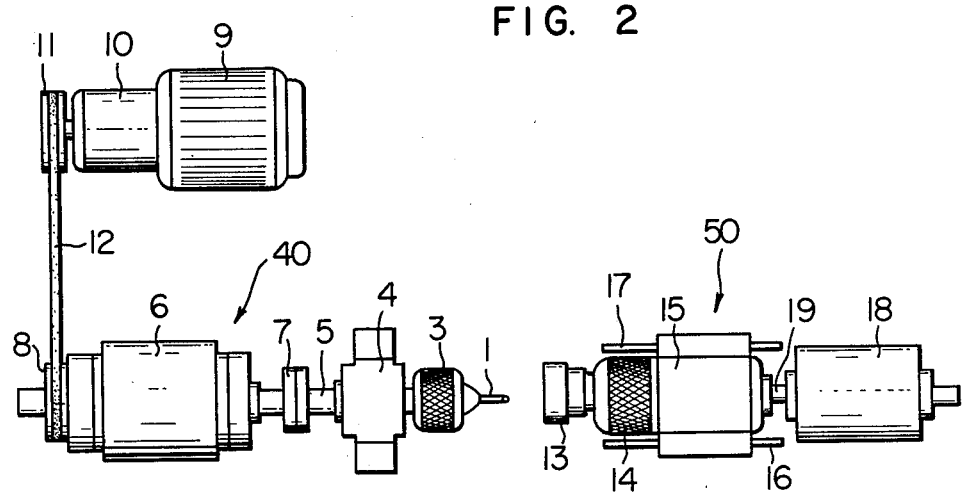
FIG. 2 is a schematic plan view of a friction welding apparatus which is constructed in accordance with a first embodiment of the invention.

FIG. 2 shows a plan view of a friction welding apparatus constructed in accordance with an embodiment of the invention. The apparatus has a rotary part generally designated at a numeral 40 and a stationary part generally designated at a numeral 50. The description will be made first as to the rotary part 40.

Figure 4:
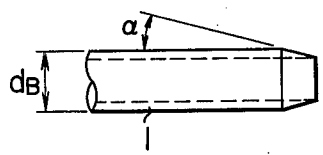
FIG. 4 is a side elevational view of the end of the rotary one of the pipes to be welded.

A reference numeral 1 denotes a pipe to be welded, made of a comparatively hard metal which is in this case copper. The pipe 1 has one end with a peripheral surface tapered at an angle $\alpha$ to the axis of the pipe 1 as shown in FIG. 4. Thanks to the provision of the tapered end surface, it is possible to smoothly introduce the rotary side pipe 1 to a later-mentioned stationary side pipe 2, even when these pipes have equal diameters, so that the undesirable axial misalignment of these pipes is conveniently avoided. A detailed description will be given as to this advantageous feature.

A drill chuck 3 adapted to grasp and hold the copper pipe 1 is supported at its shaft 5 by an angular bearing 4. A reference numeral 6 denotes a clutch/brake unit which is connected to the shaft 5 through a coupling 7. The clutch/brake unit 6 has a pulley 8 attached thereto. A reference numeral 9 denotes a motor having a reduction gear 10 unitary therewith. A V-belt is stretched between the aforementioned pulley 8 and a pulley 11 attached to the motor shaft.

Turning now to the stationary part 50, the aforementioned stationary side pipe 2 to be welded is adapted to be held by a pipe holder 13. The pipe holder 13 will be described later with specific reference to FIG. 3. The pipe holder 13 is adapted to be clamped by means of a collet chuck 14 which is adapted to be fixed by a chuck holder 15. The chuck holder 15 is provided at its lower surface with two bearings (not shown) which is adapted to make sliding engagement with the rails 16 and 17, so that the chuck holder 15 is movable to the left and right as viewed in FIG. 2.

A pneumatic cylinder 18 has a piston rod 19 which is fixed to a chuck holder 15.

Figure 5:
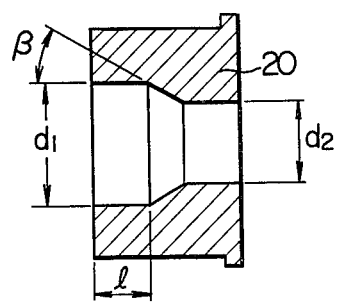
FIG. 5 is a sectional view of a heat insulating ring.
Figure 3:
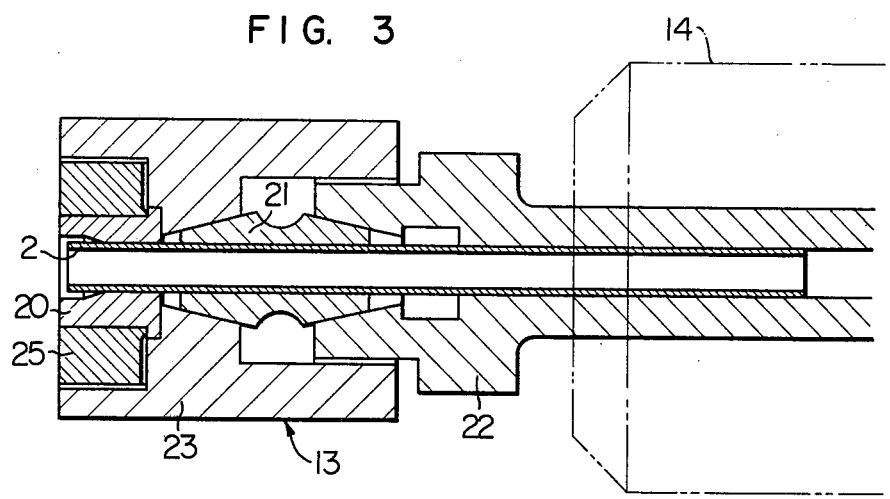
FIG. 3 is enlarged sectional view of a pipe holder of the apparatus shown in FIG. 2, the holder being adapted to hold the stationary one of the pipes to be welded.
Figure 6:
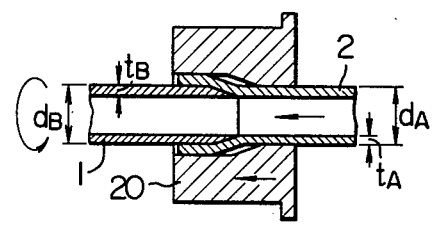
FIG. 6 is a sectional view showing the state in which the stationary pipe to be welded is gradually ironed and expanded by the rotary pipe to be welded within the heat insulating ring.

Referring now to FIG. 3 showing the detail of the pipe holder 13, the aforementioned stationary side pipe 2 to be welded has the same outside diameter as the rotary side pipe 1 and is made of a soft metal which is in this case aluminum. A ring 20 made of a heat insulating material is adapted to be fitted around the end of the pipe 2, and is provided with a tapered inner surface as shown in FIG. 5. The size $d_1$ is so selected that an ironing of 20 to 50% of the wall thickness $tA$ of the pipe 2 is effected on the latter, as the pipe 2 is expanded by the pipe 1. thus, the size $d_1$ is represented by the following equation.

$$d_1 \approx dB + (0.5 \text{ to } 0.8) \times 2tA = dB + (1 \text{ to } 1.6) \times tA$$

Also, the size $d_2$ is selected to be substantially equal to the outside diameter $dA$ of the pipe 2 to permit the insertion of the latter. Namely, the size $d_2$ is selected to satisfy the equation of:

$$d_2 \approx dA + 0.05$$

Since a preheating effect is provided by the ironing force at the straight portion, it is possible to obtain a good weld without substantially increasing the contact pressure at the joint surfaces in the direction normal to the surface. In addition, according to the invention, the bonding strength is increased by an increase of the area of jointing. For these reasons, the angle $\beta$ is preferably selected to fall within the range of between 8° and 30°. Thus, the angle $\beta$ is selected in relation to the angle $\alpha$ of chamfering of the pipe 1 to satisfy the following equation.

$$8° \leq \alpha < \beta \leq 30°$$

The material of the ring 20 has to have a sufficiently high heat insulating property and a strength higher than that of copper. For instance, rigid body impregnated asbestos which is commercially available at a comparatively low cost can be used as the material of the ring 20. However, ceramics are preferably used as the material of the ring 20, although they are more expensive.

A reference numeral 21 denotes a collect chuck which is adapted to be fitted around the pipe 2. Reference numerals 22 and 23 denote, respectively, a jig for tightening the collet and a jig for attaching the collet, respectively.

For fixing the pipe 2, the pipe 2 is inserted into the collet 21, and the collet tightening jig is tightened against the collet attaching jig 23. As a result, the clearance or notch (not shown) of the collet 21 is narrowed to make the collet 21 firmly clamp the pipe 2. The heat insulating ring 20 is attached and is fixed as a ring holder 25 is tightened.

The rotary part 40 and the stationary part 50 of the apparatus are so arranged that the pipes 1 and 2 are axially aligned with each other. It is also essential that, when pipes of different material having different resistances against the deformation are welded, the pipe having the smaller resistance is attached to the stationary side of the apparatus. For instance, in order to joint an aluminum pipe and a copper pipe to each other, the copper pipe and the aluminum pipe are attached to the rotary and stationary sides, respectively.

In operation, as the motor 9 is energized, the torque of the motor 9 is transmitted to the pulley 8 through the reduction gear 10, pulley 11 and the V-belt 12, and further to the drill chuck 3 through the clutch/brake unit 6 and the shaft 5, thereby to rotate the pipe 1. Meanwhile, as a pressurized air is delivered by a pressure source (not shown) to the pneumatic cylinder 18, the piston rod 19 is extended to move the chuck holder 15 along the rail 17, thereby to press the pipe 2 attached to the pipe holder 13 against the pipe 1 of the rotary side.

Since the peripheral surface of the end of the pipe 1 is tapered as stated before, the pipe 2 is driven onto the pipe 1, although they have an equal outside diameter. In this state, the pipe 2 is expanded spread between the tapered surfaces of the pipe 1 and the heat insulating ring 20. During this operation, the pipe 2 is ironed by the straight portion of the inner bore $d_1$ of the heat insulating ring and also by the pipe 1 to generate a heat. This heat is not radiated outwardly because of the ring 20 made of the heat insulating material and, therefore, is effectively used for preheating the pipes. Accordingly, an abrupt temperature rise is caused when the tapered surfaces make a friction engagement with each other and the boundary surfaces are molten in a short period of time. In this state, the clutch/brake unit is operated to abruptly stop the rotation of the pipe 1, and, while maintaining the contact pressure, the collet tightening jig 22 is loosened. Then, the heat insulating ring 20 is moved to the right as viewed in FIG. 2 to allow the joint area to be cooled by the ambient air, thereby to complete the welding of the pipes 1 and 2 to each other.

Figure 7:
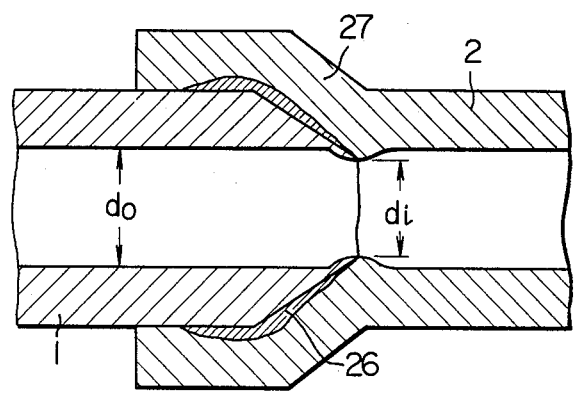
FIG. 7 is a schematic illustration of a pipe joint made by the friction welding method in accordance with the invention.

FIG. 7 schematically shows in section the weld joint as obtained by the above-stated operation of the friction welding apparatus of the invention, in which a fusion layer is designated at reference numeral 26.

Two examples of friction welding of the thin-walled pipes of copper and aluminum as performed by the apparatus shown in FIG. 2 are shown below.

Table 1 shows the principal data for the friction weldings. In each case, two pipes were frictioned for 4 seconds and the air-cooling period after the stopping of the rotary part pipe (copper pipe) was 5 seconds.

TABLE 1

Principal Data for Friction Welding

| Case No | Size of Pipe | Rotary Pipe Chamfering Angle $\alpha°$ | Size of Ring $d_1\ d_2\ \beta\ l$ (See FIG. 5) | Rotating Speed of Pipe | Pressing Load of Stationary Pipe P Pressing Speed V |
|---|---|---|---|---|---|
| 1 | Copper: Outside Dia. 8 mm Wall Thickness 1 mm Aluminum: Outside Dia. 8 mm Wall Thickness 1 mm | $\alpha = 10°$ | $d_1 = 9.3$ mm$\phi$ $d_2 = 8.05$ mm$\phi$ $\beta = 20°$ $l = 5$ mm | Copper: 3,000 rpm Aluminum: Stationary | P = 230 Kg V = 4 mm/sec |
| 2 | Copper: Outside Dia. 6.35 mm Wall Thickness 0.8 mm Aluminum: Outside Dia. 6.35 mm Wall Thickness 0.8 mm | $\alpha = 10°$ | $d_1 = 7.3$ mm$\phi$ $d_2 = 6.4$ mm$\phi$ $\beta = 20°$ $l = 5$ mm | Copper: 3,000 rpm Aluminum: Stationary | P = 230 Kg V = 4 mm/sec |

In each case, the friction welding was possible even when the outside diameters and the thickness of both pipes were reduced to 3 mm and 0.5 mm, respectively.

The characteristics of the copper-aluminum weld joints thus obtained are shown in Table 2 below. From Table 2, it will be apparent that the weld joint of each case exhibits a sufficiently high pressure resistance.

TABLE 2

Characteristics of Weld Pipe Joint

| case | tensile strength | point of breakage | pressure resistance (40 Kg/cm$^2$ 3 min. $N_2$ gas) | maximum thickness of fused compound |
|---|---|---|---|---|
| 1 | 200 Kg | aluminum matrix | no leak | about 8 $\mu$m |
| 2 | 160 Kg | aluminum matrix | no leak | about 10 $\mu$m |

Particularly, since the preheating effect is provided by an ironing effected on the aluminum pipe by the straight portion, it is possible to abruptly raise the temperature at the tapered junction surfaces. As a result, it is possible to obtain a good weld by a friction time which is as short as 2 to 4 seconds as stated before. Also, the undesirable thinning of the tapered portion denoted by numeral 27 in FIG. 7, which impairs the shape and the characteristic of the weld joint, is fairly avoided. Further, the depth of insertion of the copper pipe into the aluminum pipe is minimized to maintain the diameter $d_i$ at a level of $d_i \geq 0.7 d_o$ thereby to eliminate the necessity of the subsequent cutting of the inner peripheral surface of the weld joint.

In the described embodiment, the stationary pipe is moved into pressure contact with the rotary pipe. This, however, is not exclusive and the arrangement may be such that the rotary pipe is moved and pressed against the stationary pipe.

It is also possible to effect the friction welding by rotating at high speed the pipe around which the heat insulating ring is fitted, while keeping stationary the chamfered pipe.

As will be apparent from the foregoing description, the present invention offers the following advantages.

Conventionally, it has been impossible to joint by friction welding two pipes which are liable to be deformed due to small thickness or diameter, particularly when these pipes are made of different materials which exhibit poor weldability to each other, e.g. copper pipe and aluminum pipe. However, according to the invention, it is possible to joint these pipes by friction welding in quite a short period of time which is 10 seconds or shorter including the friction time and the cooling time.

It is also to be appreciated that the amount of projection of weld part on the inner peripheral surface of the weld joint is diminished to eliminate the necessity of the subsequent cutting of the inner peripheral surface of the weld joint, which in turn contributes greatly to the improvement in the efficiency of the work.

What is claimed is:

1. A method of joining metal pipes by friction welding in which a first metal pipe and a second metal pipe are welded together at their end portions, said second metal pipe having an inner diameter equal to or greater than the inner diameter of the first metal pipe and smaller than the outer diameter dB of the first metal pipe, comprising the steps of;

forming a tapering surface section on the outer wall surface of the forward end portion of the first metal pipe, said tapering surface section being contiguous with a straight surface section and inclined at an angle $\alpha$ with respect to the center axis and having a predetermined length from its starting point to its terminating point so that the forward end of the first metal pipe to be joined has an outer diameter equal to or smaller than the inner diameter of the forward end portion of the second metal pipe, and preparing a ring made of a heat insulating material including a pipe inserting section, an inner cylindrical section and an intermediate section, said pipe inserting section having a bore of a diameter d2 substantially equal to or slightly greater than the outer diameter dA of the second metal pipe, said inner cylindrical section having a bore of a diameter $d_1$ smaller than $dB+2tA$ where tA is the thickness of the second metal pipe and greater than dB, and said intermediate section being interposed between said pipe inserting section and said inner cylindrical section and having a bore defined by the inner wall surface inclined at an angle $\beta$ with respect to the center axis so that the diameter of the bore increases from d2 to d1, said angle $\alpha$ being smaller than said angle $\beta$ and $8°\leq\alpha<\beta\leq30°$;

placing the forward end portion of the second metal pipe in the bore of the ring and bringing the forward end portion of the second metal pipe into juxtaposed relation on the center axis to the forward end portion of the first metal pipe formed with the tapering surface section in the first step;

moving the first metal pipe and the second metal pipe axially into engagement while rotating same about the center axis relative to each other and pressing same against each other to expand the forward end portion of the second metal pipe by the tapering surface section of the first metal pipe, further pressing same against each other to continue the expansion to cause the forward end of the second metal pipe to slip into a gap between the inner wall surface of the inner cylindrical section of the ring and the outer wall surface of the first metal pipe and further pressing same against each other until the second metal pipe is brought into contact with the minimum diameter portion of the tapering inner wall surface of the intermediate section of the ring to fill a gap between the first metal pipe and the ring, so that the tapering surface section and the straight surface section of the outer wall surface of the forward end portion of the first metal pipe and the inner wall surface of the forward end portion of the second metal pipe can be welded together as they are heated by the heat of rotational friction while the outer wall surface of the second metal pipe is being supported by the ring; and ceasing movement and rotation of the second metal pipe and the first metal pipe and cooling same prior to removal of the ring from the second metal pipe welded to the first metal pipe.

2. A method as set forth in claim 1, wherein the inner diameter and the outer diameter of the first metal pipe are equal to those of the second metal pipe.

3. A method as set forth in claim 1, wherein the diameter $d_1$ of the bore of the inner cylindrical section of the ring has the relation $(dB+tA)\leq d_1\leq(dB+1.6tA)$.

4. A method as set forth in claim 3, wherein the inner diameter and the outer diameter of the first metal pipe are equal to those of the second metal pipe.

5. A method as set forth in any one of claims 1-4, wherein the first metal pipe is made of copper and the second metal pipe is made of aluminum.

6. A method as set forth in any one of claims 1, 3, 2 or 4, wherein the outer diameter of the first metal pipe and the second metal pipe is in the range between 3 and 8 mm and the thickness thereof is in the range between 0.5 and 1 mm, so that the pipes are of small diameter and small thickness.

7. A method as set forth in claim 6, wherein the first metal pipe is made of copper and the second metal pipe is made of aluminum.

* * * * *